(12) United States Patent
Goulet (10) Patent No.: US 7,784,636 B2
(45) Date of Patent: Aug. 31, 2010

(54) COMMUNICATIONS BOXES HAVING FLEXIBLE SEALS

(75) Inventor: Burt Goulet, Bloomville, NY (US)

(73) Assignee: Sportsfield Specialties, Inc., Delhi, NY (US)

( * ) Notice: Subject to any disclaimer, the term of this patent is extended or adjusted under 35 U.S.C. 154(b) by 255 days.

(21) Appl. No.: 12/039,144

(22) Filed: Feb. 28, 2008

(65) Prior Publication Data

US 2008/0146077 A1 Jun. 19, 2008

Related U.S. Application Data (63) Continuation-in-part of application No. 11/389,345, filed on Mar. 24, 2006.

(60) Provisional application No. 60/665,759, filed on Mar. 28, 2005.

(51) Int. Cl.
B65D 85/00 (2006.01)
B65D 25/04 (2006.01)
(52) U.S. Cl. ..................... 220/526; 220/529
(58) Field of Classification Search .......... 220/797, 220/804, 806, 796, 801, 533, 532, 529, 3.92, 220/3.7, 328, 629, 628, 652, 651, 643, 640, 220/526, 523, 500; 277/309, 311; 292/307 B, 292/308; 174/562, 561, 560, 50.51, 50.5; D9/439

See application file for complete search history.

(56) References Cited

U.S. PATENT DOCUMENTS

| 367,981 | A | * | 8/1887 | Hodge | 312/306 |
|---|---|---|---|---|---|
| 2,746,824 | A | * | 5/1956 | Bond | 312/7.1 |
| 3,140,344 | A | * | 7/1964 | Slater et al. | 174/67 |
| 3,394,833 | A | * | 7/1968 | Forni et al. | 52/169.6 |
| 4,095,719 | A | * | 6/1978 | Wolf | 220/4.22 |
| 4,313,609 | A | * | 2/1982 | Clements | 277/641 |

(Continued)

FOREIGN PATENT DOCUMENTS

EP 393236 A1 * 10/1990

OTHER PUBLICATIONS

"VersaCom Boxes," Gill Athletics, http://www.gillathletics.com/facilityCD/facilityCD_files/Page679.htm, 2-pages, Apr. 24, 2007.

(Continued)

*Primary Examiner*—Anthony Stashick
*Assistant Examiner*—Robert J Hicks
(74) *Attorney, Agent, or Firm*—Heslin Rothenberg Farley Mesiti P.C.

(57) ABSTRACT

A communications box for use beneath the surface of artificial turf includes a container having a peripherally-extending upper edge. A first resilient flexible seal extends vertically from and along the peripherally-extending top edge of the container. A cover includes a peripherally-extending edge, and at least one hand hole extending through the cover. A second resilient flexible seal extends vertically from and along the peripherally-extending edge of the cover. The cover and the second flexible seal are sized to be received within the first flexible seal extending from the peripherally-extending top edge of the container, and the first and the second resilient flexible seals prevent material from falling into the communications box when the cover is removed from the container. Seals may be provided around the hand hole and a lid receivable in the hand hole.

18 Claims, 5 Drawing Sheets

U.S. PATENT DOCUMENTS

| | | | | | |
|---|---|---|---|---|---|
| 4,381,063 | A | * | 4/1983 | Leong | 220/242 |
| 4,654,470 | A | * | 3/1987 | Feldman et al. | 174/50 |
| 4,667,842 | A | * | 5/1987 | Collins | 220/789 |
| 5,316,167 | A | * | 5/1994 | Kay | 220/328 |
| 5,789,702 | A | * | 8/1998 | Perella | 174/481 |
| 6,407,928 | B1 | * | 6/2002 | Falkenberg et al. | 361/760 |
| 6,573,448 | B2 | * | 6/2003 | Mayer et al. | 174/481 |
| 2006/0105625 | A1 | * | 5/2006 | Scott | 439/535 |
| 2006/0171107 | A1 | * | 8/2006 | Yamamoto et al. | 361/683 |
| 2006/0216987 | A1 | | 9/2006 | Goulet | 439/535 |

OTHER PUBLICATIONS

F900- VersaCom Box- Turf Version, Gill Athletics, Champaign, IL, 5-pages, Nov. 4, 2004.

F910- VersaCom Box- Synthetic Version, Gill Athletics, Champaign, IL, 6-pages, Nov. 4, 2004.

F920- VersaCom Half Box- Turf Version, Gill Athletics, Champaign, IL, 4-pages, Nov. 4, 2004.

F930- VersaCom Half Box- Synthetic Version, Gill Athletics, Champaign, IL, 6-pages, Nov. 4, 2004.

"Communications/Electrical Box," Sports Edge, http://www.sportsedge.com/Communication_Boxes/, 9-pages, Nov. 4, 2004.

UCS Spirit, 712-1100 and 712-1200 Series Communication Boxes, 1-page, Mar. 2007.

Sports Field Electrical & Communication Junction Box Brochure. Sports Edge, 4 pages, 2000.

Electrical/Communication Junction Box, Sports Edge, Model Nos. ComBox 3000 and ComBox 3500, Cut sheets and Installation Notes, 10-pages, 2002.

* cited by examiner

COMMUNICATIONS BOXES HAVING FLEXIBLE SEALS

CROSS-REFERENCE TO RELATED APPLICATIONS

This application is a continuation-in-part of U.S. patent application Ser. No. 11/389,345, filed Mar. 24, 2006, entitled "COMMUNICATIONS BOX", which claims priority based upon U.S. provisional patent application Ser. No. 60/665,759, filed on Mar. 28, 2005, entitled "COMMUNICATIONS BOX", the entire subject matter of these applications being incorporated herein by reference.

TECHNICAL FIELD

This invention relates to boxes for retaining communications equipment and, more specifically, to communications boxes placed underground in athletic fields for retaining communications equipment for use during sports and athletic events.

BACKGROUND OF THE INVENTION

In the past, communications boxes have been used for sports and athletic events. Two types of communications boxes have been required, one for use under artificial turf and another for use beneath the surface of a track. Each of these two types of communications boxes were distinctive and each had its own cover. Unfortunately, the covers were not interchangeable. The existence of two such communications boxes created confusion during construction. A communications box intended for use under a track would be installed under artificial turf and vice versa. The result would be that the misplaced communications box would have to be dug up and the appropriate box would have to then be installed. This unfortunate procedure resulted in obvious economic loss and time delay. Since the cover of the appropriate box did not fit the inappropriate box that had been improperly installed, the mere exchange of covers was not possible. Therefore, it is apparent that a box that could be used for both situations and could accommodate either cover would avoid this economic loss and time delay. To achieve this result, a communications box would have to be developed that could be adapted to serve either purpose and to use either cover.

SUMMARY OF THE INVENTION

In a first aspect, the present invention provides a communications box for use beneath the surface of artificial turf. The communications box includes a container defining a peripherally-extending upper edge and a chamber therein, and a first resilient flexible seal extending vertically from and along the peripherally-extending top edge of the container. A cover has a top surface, a peripherally-extending edge, and at least one hand hole extending through the cover. A second resilient flexible seal extends vertically from and along the peripherally-extending edge of the cover. The cover and the second flexible seal are sized to be received within the first flexible seal extending from the peripherally-extending top edge of the container, and the first and the second resilient flexible seals prevent material from falling into the communications box when the cover is removed from the container.

In a second aspect, the present invention provides a communications box for use beneath the surface of artificial turf. The communications box includes a base, two pairs of opposing sides, both pairs of sides being connected to the other pair of sides and being connected to the base and the pairs of sides defining a peripherally-extending top edge, and an interior surface and an exterior surface. A partition is located between one pair of sides and being generally parallel to the other pair of sides. Means are provided for securing the partition to the one pair of opposing sides in either one of the two positions, the partition being closer to the top edge in one of the two positions. A first resilient flexible seal extends vertically from and along the peripherally-extending top edge of the container. A cover has an outside surface, an inside surface, and a peripherally-extending edge, the inside surface and having at least one hand hole extending through the cover. A second resilient flexible seal extends vertically from and along the peripherally-extending edge of the cover. Means are provided to retain the cover in place at the top edge, the inside surface resting upon the means to retain the cover in place, and means are provided to adjust the position of the means to retain the cover in place. The cover and the second flexible seal are sized to be received within the first flexible seal extending from the peripherally-extending top edge of the container, and the first and the second resilient flexible seals prevent material from falling into the communications box when the cover is removed from the container.

In a third aspect, the present invention provides a communications box for use beneath the surface artificial turf. The communications box includes a base, the base being rectangular, a pair of major sides and a pair of minor sides, the major sides generally being the same size and being substantially parallel to one another, the minor sides being smaller than the major sides and generally being the same size and being generally parallel to one another, the major sides being connected to the minor sides generally at right angles to one another, the major sides and the minor sides each defining a peripherally-extending top edge and an interior surface and an exterior surface. A partition is located between the major sides and generally parallel to the minor sides. A pair of partition brackets secure the partition, the partition brackets being secured to the major side, each partition bracket having two pairs of bolt holes. Partition stud nuts secure the exterior surface of both major sides, wall holes in the sides communicating with the partition stud nuts. Partition stud bolts in which one partition stud bolt is located in one bolt hole of each pair of bolt holes in the partition bracket. A cover bracket having a right angle member with a vertical part and a horizontal part is located a short distance on the interior surface from the top edge. The cover bracket is mounted on both the major sides and the minor sides, and each vertical part has a pair of openings vertically aligned with one another and in a spaced relationship to one another. A first angled resilient flexible seal having a horizontal leg is attached to the cover bracket and a vertical leg extends vertically from and the cover bracket and along and above the peripherally-extending top edge of the container. Cover stud nuts are mounted on the exterior surface, the major sides and the minor sides having wall holes which communicate with the stud nuts. Cover stud bolts are located in one opening of the pairs of bolt holes in the vertical part and engaging a stud nut. A cover has an outside surface and an inside surface, the inside surface resting upon the cover brackets. The cover has a pair of hand holes extending through the cover, and the hand holes are rectangular. A second resilient flexible seal extends vertically from and along the peripherally-extending edge of the cover. The cover and the second flexible seal are sized to be received within the first flexible seal extending from the peripherally-extending top edge of the container, and the first and the second resilient flexible seals prevent material from falling into the communications box when the cover is removed from the container.

In a fourth aspect, the present invention provides a method for preventing track material from falling into a container of a communications box when a cover is removed. The method includes providing a first flexible resilient flexible seal extending vertically from and along a top peripherally-extending edge of the container of the communication box, and providing a second resilient flexible seal extending vertically from and along a peripherally-extending edge of the cover. In another aspect, the method may include providing a third resilient flexible seal extending vertically from the cover around a periphery of at least one hand hole in the cover, and providing a fourth resilient flexible seal extending vertically from and along a peripherally-extending edge of at least one hand hole lid receivable in the at least one hand hole of the cover.

BRIEF DESCRIPTION OF THE DRAWINGS

The subject matter, which is regarded as the invention, is particularly pointed out and distinctly claimed in the concluding portion of the specification. The invention, however, both as to organization and method of practice, together with further objects and advantages thereof, may best be understood by reference to the following detailed description of the preferred embodiments and the accompanying drawings in which:

DETAILED DESCRIPTION OF THE INVENTION

The present invention is directed to communications boxes having one or more flexible seals, for example, disposed around the container, the cover, and/or lids of the communications boxes as described in greater detail below. The flexible seals of the communications boxes aid in inhibiting material such as infill material, e.g., a "sand/rubber mixture," associated with artificial turf systems, from falling into the communications box when the cover and/or the lids of the communications box are removed.

Figure 1:
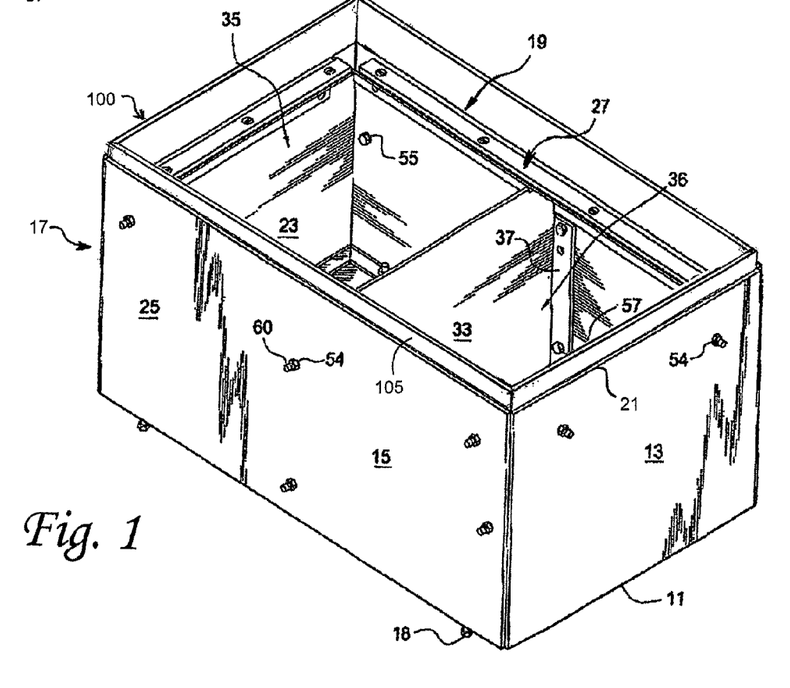
FIG. 1 is a perspective view of one embodiment of a communications box shown without a cover in which the container includes a first flexible seal disposed around the top edge of the container in accordance with the present invention.

FIG. 1 illustrates one embodiment of a container of a communications box in accordance with the present invention. In this illustrated embodiment, the communications box may be rectangular and include a base 11, and two minor sides 13 and two major sides 15. The two major sides 15 are secured to the two minor sides 13 substantially at right angles and the major sides 15 and the minor sides 13 are secured to the base 11 substantially at right angles to the base 11. The two major sides 15 are substantially parallel to one another and the two minor sides 13 are substantially parallel to one another. The major sides 15 are larger than the minor sides 13.

The base 11, the major sides 15 and the minor sides 13 form a container 17 which is the foundation of the communications box. Adjustors 18 are located in the base 11 and are used to level the communications box. The container 17 forms an interior space or chamber 19. The major sides 15 and the minor sides 13 include a peripherally-extending top edge 21, an interior surface 23 within the container 17, and an exterior surface 25 on the outside of the container 17.

Figure 2:
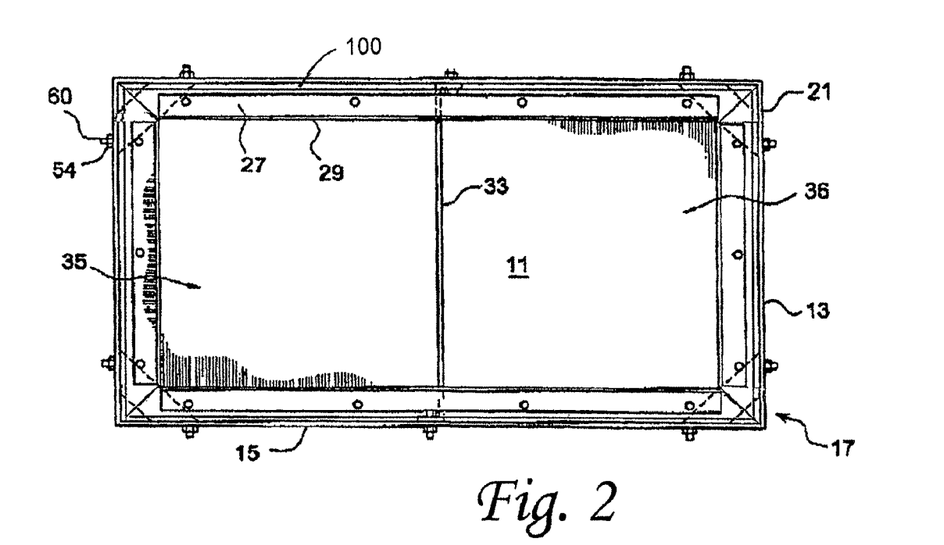
FIG. 2 is a top plan view of the communications box of FIG. 1 looking down into the communications box with the cover removed showing the partition in the communications box and also showing the cover bracket and the first flexible seal.
Figure 3:
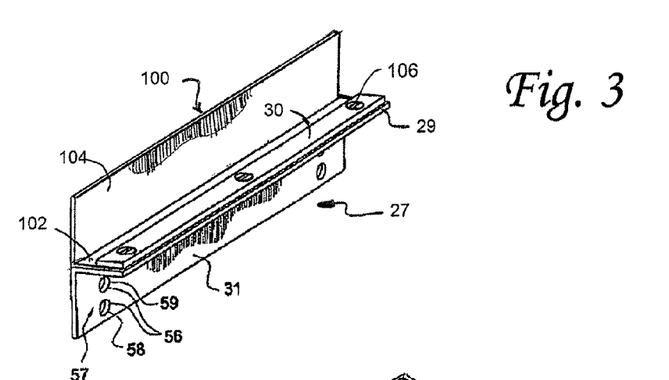
FIG. 3 is a perspective view of the cover bracket of FIG. 1 used to support the cover and the first flexible seal, and showing a pair of bolt holes used to adjust the position of the bracket and first flexible seal relative to the top edge of the container.

With reference to FIGS. 1, 2 and 3, adjacent to the top edge 21 but slightly toward the base 11 and generally evenly spaced from the top edge 21, there is located a cover bracket 27 on the interior surface 23 of the container 17. The cover bracket 27 is preferably an angle member having a horizontal part 29 and a vertical part 31. The horizontal part 29 and the vertical part 31 preferably, but not necessarily, are the same size. The vertical part 31 is secured to the interior surface 23 of the major sides 15 and the minor sides 13. The cover bracket 27 is preferably continuously located beneath the top edge 21 on the interior surface 23 and within the interior space 19.

In accordance with the present invention, a first flexible seal 100 extends vertically form and along the peripherally-extending top edge 21 of container 17, e.g., disposed around an upper, inner perimeter of container 17. For example, the first flexible seal 100 may be an angled seal having a horizontal leg 102 and a vertical leg 104. The horizontal leg 102 and the vertical leg 104 may be generally the same size. The horizontal leg 102 may be sandwiched between the horizontal part 29 of the cover bracket 27 and an elongated member or retainer 30. A plurality of screws 106 may secure the retainer 30 to the horizontal part 29 with the horizontal leg 102 of the first flexible seal 100 disposed therebetween.

When the cover bracket 27 is attached to the interior surface 23 of the container 17, desirably an upper portion 105 (FIG. 1) of leg 104 of the first flexible seal 100 extends above the top edge 21 of the container 17. It will be appreciated that the first flexible seal may be a continuous flexible seal which extend around the perimeter or may be formed, for example, from four separate angled seal pieces each of which corresponds to one of the major and minor sides of the container.

A partition 33 is located within the container 17 so as to form two compartments 35 and 36 but mostly to provide added wall area on the partition 33 upon which communications equipment can be located. The partition 33 is preferably located from a major side 15 to a major side 15 and generally parallel to the minor sides 13 and is usually placed midway between the two minor sides 13. However, variations in the placement of the partition 33 within the container 17 are possible. Partition brackets 37, which are similar to the cover bracket 27, secure the partition 33 to the major sides 15. The partition brackets 37 are placed against the major sides 15 and are secured in a suitable manner to the partition 33. The partition brackets 37 and the cover bracket 27 both provide added rigidity to the container 17.

The container 17 may be used for two similar but distinctive communications boxes, namely a communications box for use under artificial turf such as a sand/rubber mixture, and a communications box for use under a track. The primary difference between these two communication boxes is the cover which is placed on the cover bracket 27 to close the container 17. For example, there is a turf cover 39, shown in FIG. 1A, for use under artificial turf, and a track cover 40, shown in FIG. 1B, for use beneath a track.

Figure 1A:
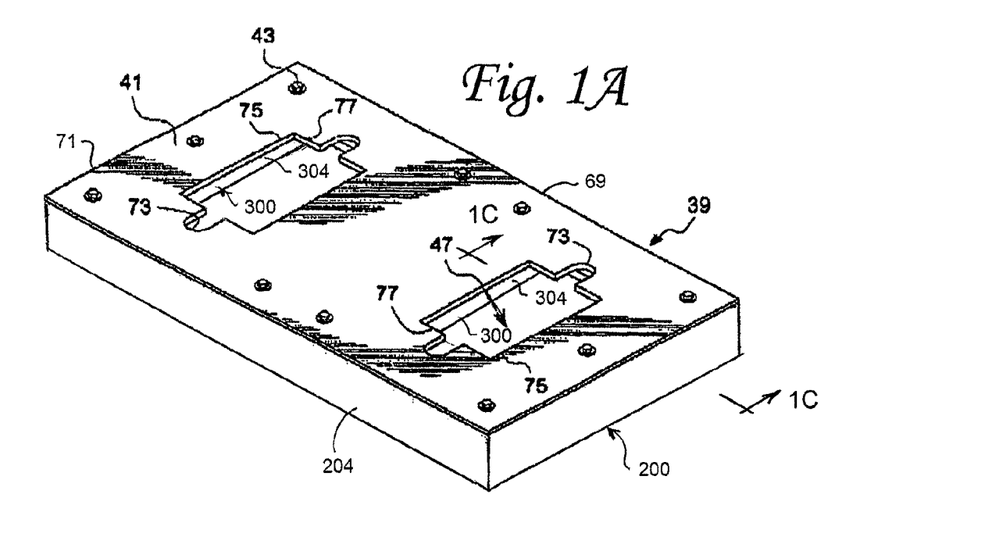
FIG. 1A is a bottom perspective view of one embodiment of a turf cover for the communications box of FIG. 1 for use under artificial turf in which the turf cover has a second flexible seal disposed around the peripherally-extending edge of the turf cover, and third flexible seals disposed around the hand hole or openings in the turf cover in accordance with the present invention.
Figure 1B:
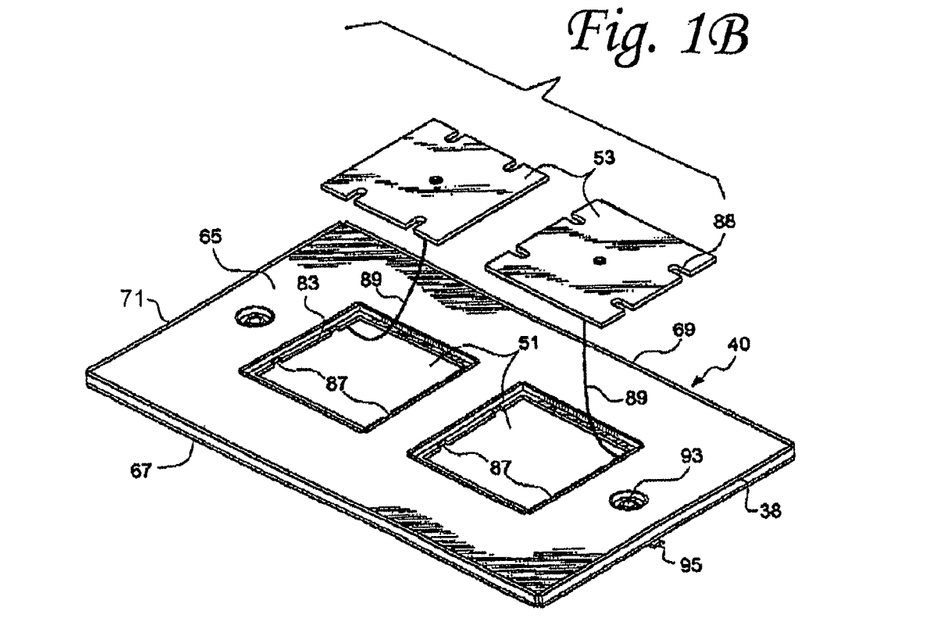
FIG. 1B is an exploded perspective view of one embodiment of a track cover for the communications box of FIG. 1 that is used in a track with the lids removed from the track cover, and one lid being aligned with its respective hand hole to close the hand hole and the other lid being aligned to permit wires to be extended from the communications box through the cover.
Figure 1C:
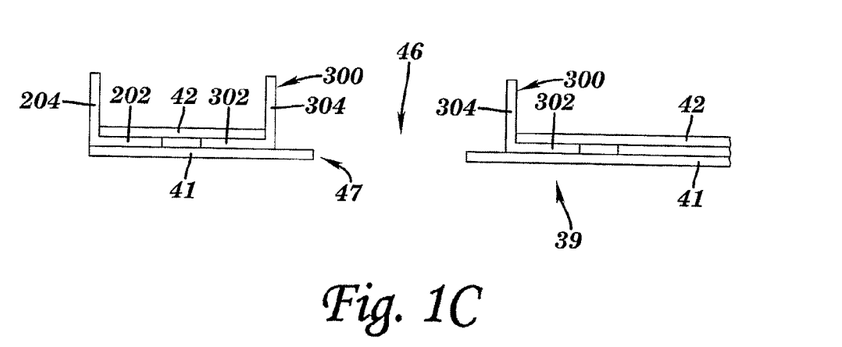
FIG. 1C is a view taken along line 1C-1C in FIG. 1A, rotated 180 degrees, illustrating the lower section, the upper section, the first flexible seal, and the third flexible seal of the turf cover of FIG. 1A.

With reference to FIGS. 1A and 1C, the turf cover 39 has two sections, namely a lower section 41 and an upper section 42 (FIG. 1C). The lower section 41 is preferably made of aluminum, as is the container 17. The upper section 42 is preferably made of plywood. The lower section 41 is secured to the upper section 42 by screws or bolts 43 which extend through the lower section 41 and into the upper section 42. Peripheral openings 45 (shown in FIG. 4A) are located about the periphery of both the lower section 41 and the upper section 42. Plugs 44 (FIG. 4B) are located in the peripheral openings 45 in the upper section 42. The peripheral openings 45 of the lower section 41 are aligned with the peripheral openings 45 of the upper section 42.

Figure 4A:
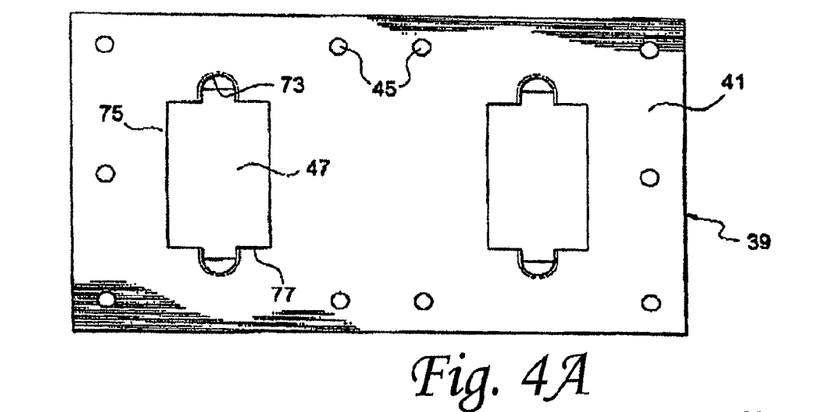
FIG. 4A is a bottom plan view of the turf cover of FIG. 1A without the lids in the hand holes.

The upper section 42 has upper hand holes 46 (FIGS. 1C and 4B) and the lower section 41 has lower hand holes 47 (FIGS. 1C and 4A). The upper hand holes 46 and the lower hand holes 47 together form the hand holes which are closed by the lids 49 (FIG. 4B) when placed into the upper hand holes 46.

A second flexible seal 200 is disposed around the perimeter of turf cover 39. For example, second flexible seal 200 may be an angled seal having a horizontal leg 202 (FIG. 1C) and a vertical leg 204. Horizontal leg 202 and vertical leg 204 may be generally the same size. The turf cover 39 is desirably sized to be press fitted into the container 17 and against the first flexible seal 100 and the cover bracket 27. When this is done, the second seal of the cover is disposed adjacent to the first seal of the container. The top edge of the seals may be disposed at the same elevational height.

Cover 39 may also include one or more third flexible seals 300 disposed around the hand holes 46 of upper section 42 of the turf cover 39. For example, third flexible seal 300 may be an angled seal having a horizontal leg 302 (FIG. 1C) and a vertical leg 304. The horizontal leg 302 and the vertical leg 304 may also be the same size. The horizontal leg 302 of the flexible seal 300 may be sandwiched between the lower section 41 and the upper section 42 of the turf cover 39.

Figure 4B:
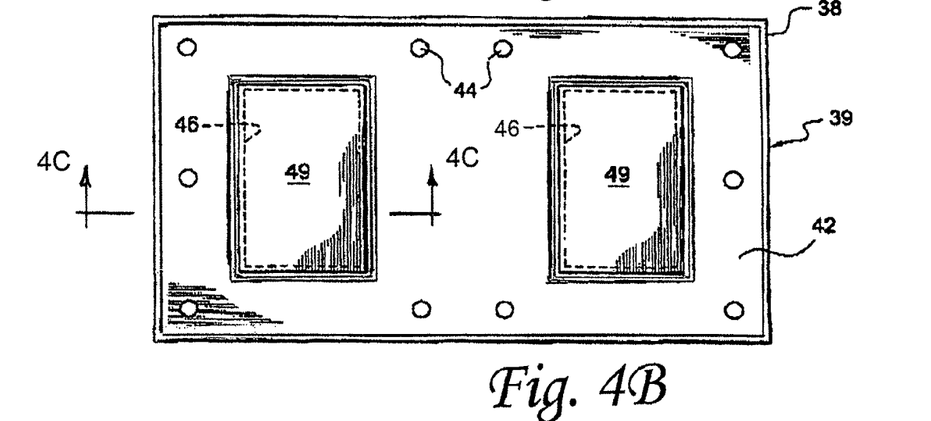
FIG. 4B is a top plan view of the cover turf of FIG. 1A for the communications box with lids in the hand holes.
Figure 4C:
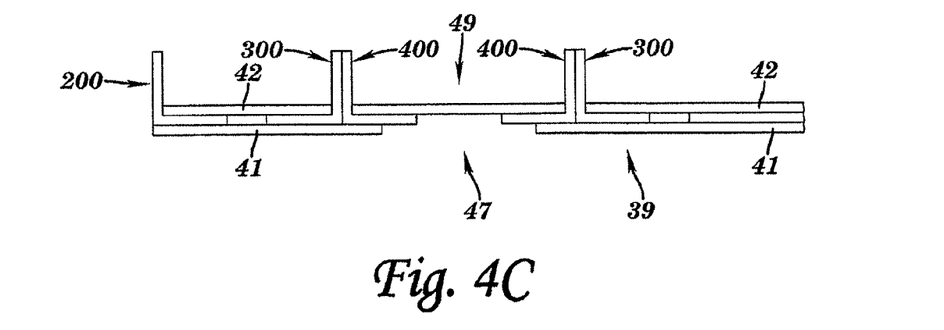
FIG. 4C is a view taken along line 4C-4C in FIG. 4B illustrating the hand hole lids, the third flexible seal, and the fourth flexible seal.

As shown in FIGS. 4A, 4B, and 4C, the turf cover 39 preferably has two turf hand holes, including the upper hand holes 46 (FIG. 4C) and the lower hand holes 47 (FIG. 4A), located through the turf cover 39. Lids 49 are placed in the upper hand holes 46 in the upper section 42. A fourth flexible seal 400 is positioned around the perimeter of lid 49 as shown in FIG. 4C. The lower hand holes 47 in the lower section 41 may be smaller than the upper hand holes 46 in the upper sections 42 so that the lids 49 cannot drop below the upper hand holes 46.

The turf hand holes of the turf cover 39 are generally rectangular with rounded loops 73 (FIG. 4A) at two opposing edges of the lower hand holes 47 of the lower section 41 of the turf cover 39. The major axis of the turf hand holes passes through the center of the rounded loops 73 as the rounded loops 73 are located generally midway between the two longer opposing edges 75 of the turf hand hole and on the outer side of the two shorter opposing edges 77 thereof. The longer opposing edges 75 of the lower section 41 of each turf hand hole are generally parallel with the minor edges 77 of the turf cover 39. As previously discussed, turf lids 49 are used to close the upper hand holes 46 thereby closing the turf hand holes.

Figure 5:
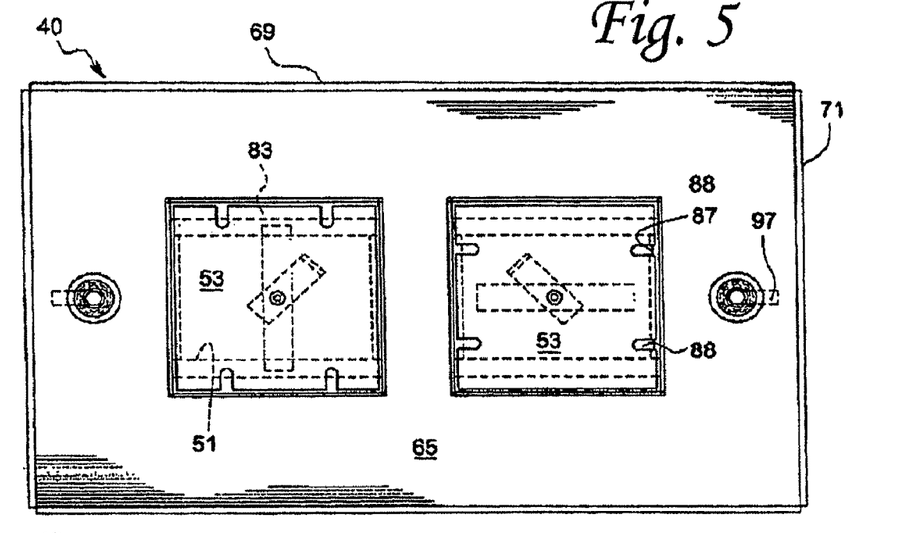
FIG. 5 is a top plan view of the track cover of FIG. 1B for use in a track with lids in the hand holes, one lid being in the closed position and the other lid being in the open position.
Figure 6:
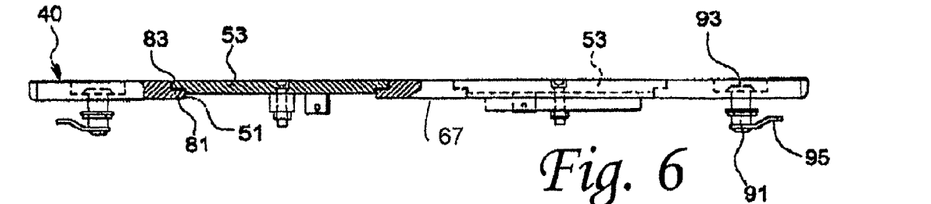
FIG. 6 is a side elevation of the track cover shown in FIG. 5 showing the clips used to hold the track cover on the communications box.
Figure 7:
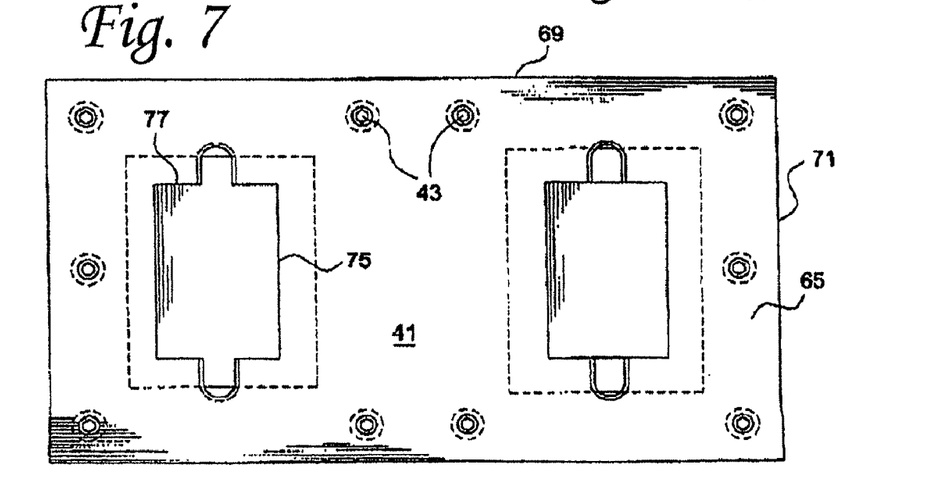
FIG. 7 is a bottom plan view of the turf cover of FIG. 1A with the outline of the hand holes of the upper section shown in broken lines.

As shown in FIGS. 5, 6, and 1B, the track cover 40 preferably has two track hand holes 51 located through the track cover 40. Each track hand hole 51 has a track lid 53 placed in it.

The track hand holes 51 may be square. The track lids 53 which are used to close the track hand holes 51 have an upper lip 83 at the outside surface 65 and around the entire periphery of each track lid 53. Each track hand hole 51 has a lower lip 81 below the outside surface 65 and at the inside surface 67 around the entire periphery of each track hand hole 51. The upper lip 83 of each track lid 53 rests upon and mates with the lip 81 of the track hand hole 51. Two opposite lower lips 81 of each of the two track hand holes 51 have a pair of cover notch 87 in it. The pair of cover notches 87 are symmetrically spaced on the lips 81 of the track hand holes 51 which are opposite from one another and are generally parallel to one another. Two opposite upper lips 83 of the track lids 53 used in the track hand holes 51 have lid notches 88 which mate with the notches 87 of the lips 81 which are notched when placed over the lips 81 that have notches 87.

When the lid notches 88 of the track lids 53 are rotated ninety degrees, the lid notches 88 of the track lids 53 are located over cover lips 81 which are not notched, thereby closing the track cover 40. Thus, when the lower notches 87 and the lid notches 88 are aligned, wires for communication purposes can be extended from the communications box through the cover notches 87 and the lid notches 88 and out of the track cover 40. When a track lid 53 is placed on the track cover 40 without the cover notches 87 and the lid notches 88 being aligned, the track cover 40, with both lids 53 so oriented, is closed.

To prevent a track lid 53 from being misplaced, the track lid 53 is secured to its respective track cover 40 by a flexible wire 89 which does not prevent removal and rotation of the track lid 53 but does prevent the track lid 53 from being misplaced. Retainers 91 (FIGS. 5 and 6) including a retainer shaft 93 and a retainer clip 95 are used to secure the track cover 40. When the retainer shaft 93 is turned by a retainer lever 97, the retainer clip 95 is placed under the cover bracket 27 thereby holding the track cover 40 in place.

The turf cover 39 and the track cover 40 are both rectangular. The turf cover 39 may be somewhat thicker than the track cover 40. To accommodate both the turf cover 39 and the track cover 40, it is necessary that the vertical part 31 of the cover bracket 27 and the partition brackets 37 be adjustable to permit changes in the location of the cover bracket 27 and the partition brackets 37 in relation to the top edge 21.

Both the turf cover 39 and the track cover 40 have an outside surface 65 and an inside surface 67. As seen in FIG. 1A and in FIG. 1B, the turf hand holes 46 and 47 and the track hand holes 51 are generally evenly spaced and symmetrically located respectively in the turf cover 39 and the track cover 40 and which extend through the turf cover 39 and the track cover 40 from the outside surface 65 to the inside surface 67. The turf cover 39 and the track cover 40 each has a pair of major edges 69 and a pair of minor edges 71 to fit respectively along the major sides 15 and the minor sides 13 of the container 17. The major edges 69 are longer than the minor edges 71.

There are various ways that the cover bracket 27 and the partition brackets 37 may be secured. With reference to FIGS. 1 and 3, a preferable way is to secure stud nuts 54 to the exterior surface 25 of the container 17, e.g., mechanically pressed permanently onto the body of the box, which communicate with wall holes 55 in the minor sides 13 and the major sides 15. Bolt holes 56 are located in the cover bracket 27 on the vertical part 31 and on the partition brackets 37. The bolt holes 56 are provided in pairs 57, the bolt holes 56 of each pair 57 of bolt holes 56 being vertically separated by a short distance. The cover bracket 27 and the partition brackets 37 must be lower to accommodate the turf cover 39 and higher to accommodate the track cover 40. Therefore, when the track cover 40 is to be used, the lower one of the bolt holes 56 of each pair 57 of bolt holes 56 are used. When the turf cover 39 is to be used, the upper bolt hole 59 of the pair 57 of bolt holes 56 is used. A stud bolt 60 is used to engage the stud nut 54 and the upper bolt hole 59 of the bolt holes 56.

From the present invention, the communications boxes may be configured in either the communications box for use under artificial turf (which includes flexible seals) or as a communications box for use under a track (which does not include flexible seals). Desirably, the seals for the communications box for use under artificial turf are not removable.

It is to be understood that the drawings and description matter are in all cases to be interpreted as merely illustrative of the principles of the invention, rather than as limiting the same in any way, since it is contemplated that various elements to achieve like results without departing from the spirit of the invention or the scope of the appended claims.

The invention claimed is:

1. A communications box for use beneath the surface of artificial turf, said communications box comprising:
    a container defining a peripherally-extending upper edge and a chamber therein;
    a first resilient flexible seal extending vertically from and along said peripherally-extending top edge of said container;
    a cover having a top surface, a peripherally-extending edge, and at least one hand hole extending through said cover;
    a second resilient flexible seal extending vertically from and along said peripherally-extending edge of said cover; and
    wherein said cover and said second flexible seal are sized to be received within the first flexible seal extending from the peripherally-extending top edge of said container, and wherein said first and said second resilient flexible seals prevent material from falling into said communications box when the cover is removed from said container.

2. The communications box of claim 1 wherein said first flexible seal comprises an angled seal having a horizontal leg and a vertical leg.

3. The communications box of claim 1 wherein said second flexible seal comprises an angled seal having a horizontal leg and a vertical leg.

4. The communications box of claim 1 wherein said first flexible seal comprises an angled seal having a horizontal leg and an a vertical leg, and further comprising a bracket attached to said interior surface of said container and said horizontal leg of said first flexible seal being attached to said bracket and wherein said second flexible seal comprises an angled seal having a horizontal leg and a vertical leg and said cover comprising an upper section and a lower section, and said horizontal leg of said second flexible seal being disposed between said upper and said lower sections.

5. The communications box of claim 1 further comprising a third resilient flexible seal extending vertically from said top surface of said cover around said at least one hand hole in said cover, at least one hand hole lid, and a fourth resilient flexible seal extending vertically from and along a peripherally-extending edge of said at least one hand hole lid, and wherein said lid and said fourth flexible seal are sized to be received within the third flexible seal extending vertically from said top surface of said cover around said at least one hand hole, and wherein said third and fourth flexible seals prevent material from falling into said communications box when said hand hole lid is removed from the cover.

6. The communications box of claim 5 wherein said third flexible seal comprises an angled seal having a horizontal leg and a vertical leg.

7. The communications box of claim 5 wherein said fourth flexible seal comprises an angled seal having a horizontal leg and a vertical leg.

8. The communications box of claim 5 wherein said third flexible seal comprises an angled seal having a horizontal leg and a vertical leg, and said fourth flexible seal comprises an angled seal having a horizontal leg and a vertical leg.

9. A communications box for use beneath the surface of artificial turf, the communications box comprising:
    a base;
    two pairs of opposing sides, both pairs of sides being connected to the other pair of sides and being connected to the base and the pairs of sides defining a peripherally-extending top edge, and an interior surface and an exterior surface;
    a partition located between one pair of sides and being generally parallel to the other pair of sides;
    means for securing the partition to the one pair of opposing sides in either one of the two positions, the partition being closer to the top edge in one of the two positions;
    a first resilient flexible seal extending vertically from and along the peripherally-extending top edge of the container;
    a cover having an outside surface, an inside surface, and a peripherally-extending edge, the inside surface and having at least one hand hole extending through the cover;
    a second resilient flexible seal extending vertically from and along the peripherally-extending edge of the cover;
    means to retain the cover in place at the top edge, the inside surface resting upon the means to retain the cover in place;
    means to adjust the position of the means to retain the cover in place;
    wherein the cover and the second flexible seal are sized to be received within the first flexible seal extending from the peripherally-extending top edge of the container, and wherein the first and the second resilient flexible seals prevent material from falling into the communications box when the cover is removed from the container.

10. The communications box of claim 9 further comprising a third resilient flexible seal extending vertically from the top surface of the cover around the at least one hand hole in the cover, at least one hand hole lid, and a fourth resilient flexible seal extending vertically from and along a peripherally-extending edge of the at least one hand hole lid, and wherein the lid and the fourth flexible seal are sized to be received within the third flexible seal extending vertically from the top surface of the cover around the at least one hand hole, and wherein the third and fourth flexible seals prevent material from falling into the communications box when the hand hole lid is removed from the cover.

11. A communications box for use beneath the surface artificial turf, the communications box comprising;
   a base, the base being rectangular;
   a pair of major sides and a pair of minor sides, the major sides generally being the same size and being substantially parallel to one another, the minor sides being smaller than the major sides and generally being the same size and being generally parallel to one another, the major sides being connected to the minor sides generally at right angles to one another, the major sides and the minor sides each defining a peripherally-extending top edge and an interior surface and an exterior surface;
   a partition located between the major sides and generally parallel to the minor sides;
   a pair of partition brackets secured to the partition, the partition brackets being secured to the major side, each partition bracket having two pairs of bolt holes;
   partition stud nuts secured to the exterior surface of both major sides, wall holes in the sides communicating with the partition stud nuts;
   partition stud bolts, one partition stud bolt being located in one bolt hole of each pair of bolt holes in the partition bracket;
   a cover bracket being a right angle member having a vertical part and a horizontal part and being located a short distance on the interior surface from the top edge, the cover bracket being mounted on both the major sides and the minor sides, each vertical part having a pair of openings vertically aligned with one another and in a spaced relationship to one another;
   a first angled resilient flexible seal having a horizontal leg attached to the cover bracket and a vertical leg extending vertically from and the cover bracket and along and above the peripherally-extending top edge of the container;
   cover stud nuts mounted on the exterior surface, the major sides and the minor sides having wall holes communicating with the stud nuts;
   cover stud bolts located in one opening of the pairs of bolt holes in the vertical part and engaging a stud nut;
   a cover having an outside surface and an inside surface, the inside surface resting upon the cover brackets, the cover having a pair of hand holes extending through the cover, the hand holes being rectangular;
   a second resilient flexible seal extending vertically from and along the peripherally-extending edge of the cover; and
   wherein the cover and the second flexible seal are sized to be received within the first flexible seal extending from the peripherally-extending top edge of the container, and wherein the first and the second resilient flexible seals prevent material from falling into the communications box when the cover is removed from the container.

12. The communications box of claim 11 further comprising a third resilient flexible seal extending vertically from the top surface of the cover around the at least one hand hole in the cover, at least one hand hole lid, and a fourth resilient flexible seal extending from and along a peripherally-extending edge of the at least one hand hole lid, and wherein the lid and the fourth flexible seal are sized to be received within the third flexible seal extending vertically from the top surface of the cover around the at least one hand hole, and wherein the third and fourth flexible seals prevent material from falling into the communications box when the hand hole lid is removed from the cover.

13. A method for preventing track material from falling into a container of a communications box, the method comprising:
   providing the communications box of claim 1 disposed beneath the surface of artificial turf;
   removing the cover from the container;
   inhibiting material from falling into the container via a first resilient flexible seal extending vertically from and along a top peripherally-extending edge of the container of the communication box; and
   inhibiting material disposed on the cover from falling into the container via the second resilient flexible seal extending vertically from and along a peripherally-extending edge of the cover.

14. A method for preventing track material from falling into a container of a communications box, the method comprising:
   providing the communications box of claim 5 beneath the surface of artificial turf;
   removing the at least one handhold lid from the cover;
   inhibiting material from falling into the container via the third resilient flexible seal extending vertically from the top surface of the cover around the at least one hand hole in the cover; and
   inhibiting material disposed on the cover from falling into the container via the fourth resilient flexible seal extending vertically from and along a peripherally-extending edge of said at least one hand hole lid.

15. A method for preventing track material from falling into a container of a communications box when a cover is removed, the method comprising:
   providing the communications box of claim 9 beneath the surface of artificial turf;
   removing the cover from the container;
   inhibiting material from falling into the container via a first resilient flexible seal extending vertically from and along a top peripherally-extending edge of the container of the communication box; and
   inhibiting material disposed on the cover from falling into the container via the second resilient flexible seal extending vertically from and along a peripherally-extending edge of the cover.

16. A method for preventing track material from falling into a container of a communications box, the method comprising:
   providing the communications box of claim 10 beneath the surface of artificial turf;
   removing the at least one handhold lid from the cover;
   inhibiting material from falling into the container via the third resilient flexible seal extending vertically from the top surface of the cover around the at least one hand hole in the cover; and inhibiting material disposed on the cover from falling into the container via the fourth resilient flexible seal extending vertically from and along a peripherally-extending edge of said at least one hand hole lid.

17. A method for preventing track material from falling into a container of a communications box when a cover is removed, the method comprising:
   providing the communications box of claim 11 beneath the surface of artificial turf;
   removing the cover from the container;
   inhibiting material from falling into the container via a first resilient flexible seal extending vertically from and along a top peripherally-extending edge of the container of the communication box; and
   inhibiting material disposed on the cover from falling into the container via the second resilient flexible seal extending vertically from and along a peripherally-extending edge of the cover.

18. A method for preventing track material from falling into a container of a communications box, the method comprising:
   providing the communications box of claim 12 beneath the surface of artificial turf;
   removing the at least one handhold lid from the cover;
   inhibiting material from falling into the container via the third resilient flexible seal extending vertically from the top surface of the cover around the at least one hand hole in the cover; and
   inhibiting material disposed on the cover from falling into the container via the fourth resilient flexible seal extending vertically from and along a peripherally-extending edge of said at least one hand hole lid.

\* \* \* \* \*